(12) United States Patent
Chien et al.

(10) Patent No.: US 8,230,170 B2
(45) Date of Patent: Jul. 24, 2012

(54) DATA STORAGE SYSTEM AND CONTROL METHOD THEREOF

(75) Inventors: Hung-Ming Chien, Hsin-Chu (TW);
Cheng-Yi Huang, Hsin-Chu (TW);
Che-Jen Wang, Hsin-Chu (TW);
Kun-Tien Hsu, Hsin-Chu (TW);
Yung-Wen Huang, Hsin-Chu (TW)

(73) Assignee: Promise Technology, Inc, Hsin-Chu (TW)

( * ) Notice: Subject to any disclaimer, the term of this patent is extended or adjusted under 35 U.S.C. 154(b) by 181 days.

(21) Appl. No.: 12/885,515

(22) Filed: Sep. 19, 2010

(65) Prior Publication Data
US 2011/0276759 A1    Nov. 10, 2011

(30) Foreign Application Priority Data
May 7, 2010   (TW) ................................ 99114590 A (51) Int. Cl.
*G06F 12/00*   (2006.01)
(52) U.S. Cl. ................................. 711/114; 711/E12.001
(58) Field of Classification Search .................. 711/114, 711/E12.001
See application file for complete search history.

(56) References Cited

U.S. PATENT DOCUMENTS

| 2011/0002257 A1* | 1/2011 | Behzad et al. | 370/315 |
| 2011/0167216 A1* | 7/2011 | Huang et al. | 711/114 |
| 2011/0238910 A1* | 9/2011 | Wang et al. | 711/114 |
| 2011/0276759 A1* | 11/2011 | Chien et al. | 711/114 |

\* cited by examiner

*Primary Examiner* — Kevin Ellis
*Assistant Examiner* — Mehdi Namazi (57) ABSTRACT

The invention discloses a data storage system and a control method thereof. The data storage system according to the invention includes N groups of storage devices, where N is an integer larger than 1. The invention is to judge if the use information of one of the batches of data satisfies the set of condition thresholds relative to the group of storage devices where said one batch of data is stored, and if NO, to re-allocate said one batch of data to one of the group of storage devices whose condition thresholds are satisfied by the use information of said one batch of data and to update the virtual drive locations of said one batch of data mapping the logical locations of the storage devices.

10 Claims, 5 Drawing Sheets

| power consumption of storage device in active mode: 12.8(W/hr.) |
| power consumption of storage device in sleep mode: 1.7(W/hr.) |

|  | number of storage device | time proportion of active mode | time proportion of sleep mode | power consumption (W/hr.) |
| --- | --- | --- | --- | --- |
| group of storage devices 102 | 3 | 82% | 18% | 32.406 |
| group of storage devices 104 | 29 | 13% | 87% | 91.147 |
|  |  |  | total: | 123.553 |

FIG. 2B

| power consumption of storage device in active mode: 12.8(W/hr.) |
| power consumption of storage device in sleep mode: 1.7(W/hr.) |

|  | number of storage device | time proportion of active mode | time proportion of sleep mode | power consumption (W/hr.) |
| --- | --- | --- | --- | --- |
| ungrouped data storage system | 32 | 88% | 12% | 366.976 |

DATA STORAGE SYSTEM AND CONTROL METHOD THEREOF

CROSS-REFERENCE TO RELATED APPLICATION

This utility application claims priority to Taiwan Application Serial Number 099114590, filed May 7, 2010, which is incorporated herein by reference.

BACKGROUND OF THE INVENTION

1. Field of the Invention

The invention relates to a data storage system and control method thereof, and more particularly, to a data storage system, with group-based Redundant Array of Independent Drives (RAID) and of auto re-allocating batches of data, and control method thereof.

2. Description of the Prior Art

With more and more amount of user data stored as demanded, Redundant Array of Independent Drives (RAID) system has been widely used to store a large amount of digital data. RAID systems are able to provide high availability, high performance, or high volume of data storage volume for hosts.

The RAID system utilizes various technologies known as RAID levels, and also to be divided into RAID 0, RAID 1, RAID 2, RAID 3, RAID 4, RAID 5, and RAID 6. Each RAID level of technology has its own advantages and disadvantages.

Constitution of the well-known RAID system includes a RAID controller and a RAID composed of a plurality of disk drives. The RAID controller is coupled to each disk drive, and defines the disk drives as one or more logical disk drives selected among RAID 0, RAID 1, RAID 2, RAID 3, RAID 4, RAID 5, RAID 6, and others.

Due to rise of cloud computing technology in recent years, the storage requirements increase significantly. With the increasing of storage equipments, the topics of how to enhance access efficiency of data, how to reduce power consumption of storage equipments, how to long-term preserve data, and so on must be overcome.

SUMMARY OF THE INVENTION

Accordingly, one scope of the invention is to provide a data storage system with group-based Redundant Array of Independent Drives and of auto re-allocating batches of data and control method thereof for overcoming the mentioned above topics.

A data storage system according to a preferred embodiment of the invention includes N groups of storage devices, a controller, a group management table, a data management table, and a judging module, where N is an integer larger than 1. Each group of storage devices has a respective retained volume and respectively is specified in RAID 0 architecture, RAID 1 architecture, RAID 3 architecture, RAID 5 architecture, RAID 6 architecture, RAID 10 architecture, RAID 1E architecture, RAID 50 architecture, RAID 30 architecture, RAID 60 architecture, Hyperspeed RAID architecture, JBOD architecture, etc. that are industrial standards well defined in the arts. The controller is respectively coupled to each storage devices for controlling access of a plurality of batches of data to the storage devices. The group management table is coupled to the controller. The group management table functions storing logical locations of each group of storage devices and at least N sets of condition thresholds which each set of condition thresholds relates to one of the N groups of storage devices. The data management table is coupled to the controller. The data management table functions storing virtual drive locations of the batches of data mapping the logical locations of the storage devices and a plurality of use information which each relates to one of the batches of data. The judging module is respectively coupled to the controller, the group management table, and the data management table. The judging module functions judging if the use information of one of the batches of data satisfies the set of condition thresholds relative to the group of storage devices where said one batch of data is stored. And if the result judged by the judging module is NO, the controller will re-allocate said one batch of data to the retained volume of one of the group of storage devices whose condition thresholds are satisfied by the use information of said one batch of data, and update the virtual drive locations of said one batch of data mapping the logical locations of the storage devices in the data management table.

According to another preferred embodiment of the invention, the data storage system further includes a power control module. The power control module is respectively coupled to each of the storage devices and the group management table. The power control module functions controlling power of each group of storage devices in one of M power operation modes in accordance with the condition thresholds of said one group of storage devices, where M is an integer larger than 1.

According to another preferred embodiment of the invention, the data storage system further includes a management interface. The management interface is coupled to the group management table, and an external processing module is capable of altering the condition thresholds of each group of storage devices through the management interface.

In one embodiment, each set of condition thresholds includes a respective storage life, and the use information of each batch of data includes a storage time. The judging module functions judging if the storage time of one of the batches of data satisfies the storage life relative to the group of storage devices where said one batch of data is stored.

In one embodiment, each set of condition thresholds includes a respective access frequency threshold, and the use information of each batch of data includes an access frequency. The judging module functions judging if the access frequency of one of the batches of data satisfies the access frequency threshold relative to the group of storage devices where said one batch of data is stored.

A control method according to a preferred embodiment of the invention is used to control a data storage system. The data storage system includes N groups of storage devices, where N is an integer larger than 1. Each group of storage devices has a respective retained volume and respectively is specified in RAID 0 architecture, RAID 1 architecture, RAID 3 architecture, RAID 5 architecture, RAID 6 architecture, RAID 10 architecture, RAID 1E architecture, RAID 50 architecture, RAID 30 architecture, RAID 60 architecture, Hyperspeed RAID architecture, and JBOD architecture, etc. The control method according to the invention, firstly, is to control access of a plurality of batches of data to the storage devices. Then, the control method according to the invention is to store logical locations of each group of storage devices and at least N sets of condition thresholds which each set of condition thresholds relates to one of the N groups of storage devices. Then, the control method according to the invention is to store virtual drive locations of the batches of data mapping the logical locations of the storage devices and a plurality of use information which each relates to one of the batches of data.

Then, the control method according to the invention is to judge if the use information of one of the batches of data satisfies the set of condition thresholds relative to the group of storage devices where said one batch of data is stored. If the judged result is NO, the control method according to the invention will re-allocate said one batch of data to the retained volume of one of the group of storage devices whose condition thresholds are satisfied by the use information of said one batch of data and to update the virtual drive locations of said one batch of data mapping the logical locations of the storage devices.

The advantage and spirit of the invention may be understood by the following recitations together with the appended drawings.

DETAILED DESCRIPTION OF THE INVENTION

The invention is to provide a data storage system and a control method thereof. In particular, the data storage system according to the invention has group-based Redundant Array of Independent Drives and function of auto re-allocating batches of data. Thereby, the data storage system according to the invention has advantages of high access efficiency of data, reducing power consumption of overall storage system, long-term preservation of data, and so on. Some preferred embodiments and practical applications of this present invention would be explained in the following paragraph, describing the characteristics, spirit, advantages of the invention, and feasibility of embodiment.

Figure 1:
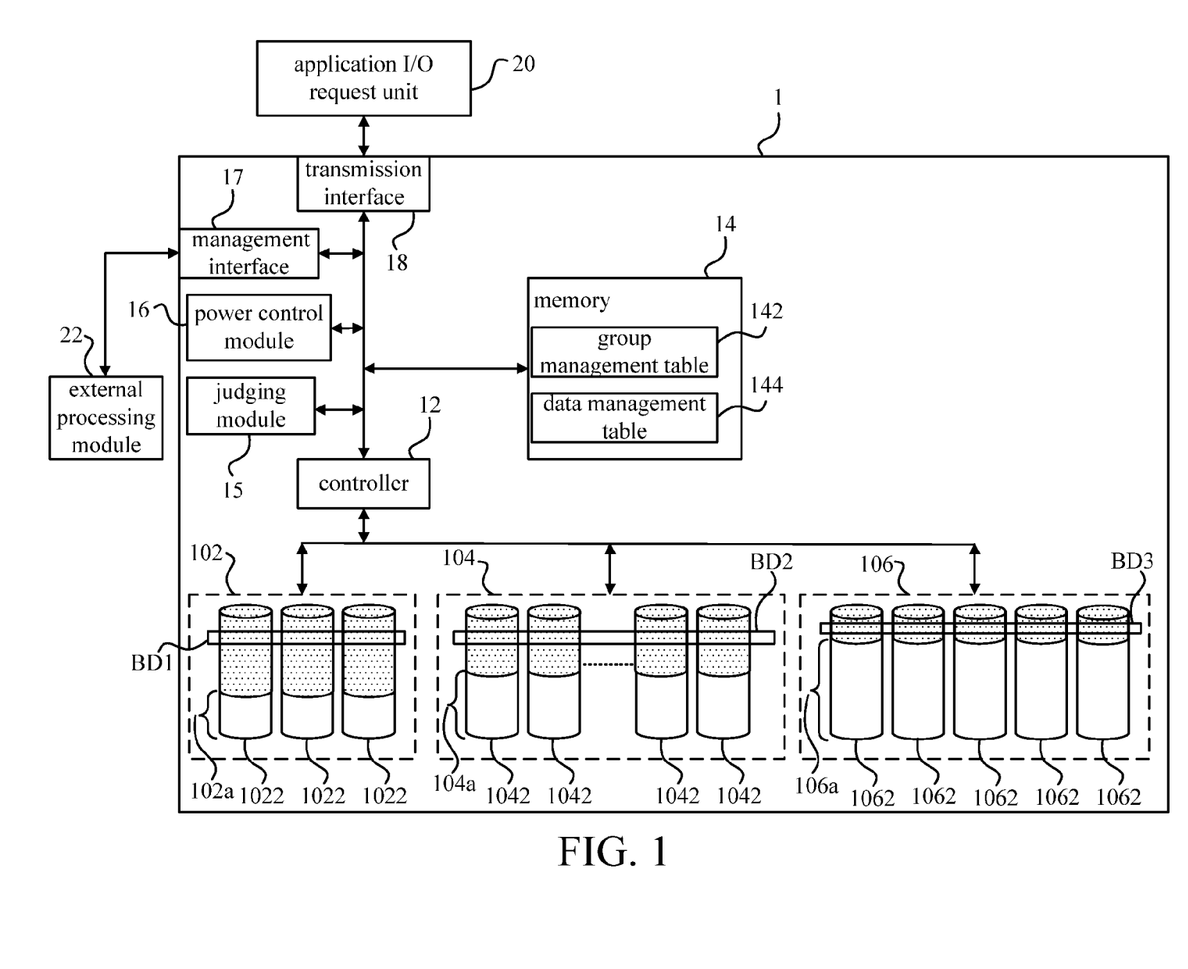
FIG. 1 is a schematic diagram showing the architecture of a data storage system 1 according to a preferred embodiment of the invention.

Please refer to FIG. 1, an architecture of a data storage system 1 according to a preferred embodiment of the invention is illustratively shown in FIG. 1.

The data storage system 1 includes N groups of storage devices (102, 104, and 106), a controller 12, a group management table 142, a data management table 144, and a judging module 15, where N is an integer larger than 1. This case shown in FIG. 1 takes three groups of storage devices as an example for explanation, i.e., the group of storage devices 102, the group of storage devices 104, and the group of storage devices 106 shown in FIG. 1.

In particular, each group of storage devices (102, 104, 106) has a respective retained volume and is respectively specified in one among RAID 0 architecture, RAID 1 architecture, RAID 3 architecture, RAID 5 architecture, RAID 6 architecture, and others such as RAID 10 architecture, RAID 1E architecture, RAID 50 architecture, RAID 30 architecture, RAID 60 architecture, Hyperspeed RAID architecture, and JBOD architecture, etc. In other words, if the groups of storage devices (102, 104, and 106) are specified in RAID 3 architecture, RAID 5 architecture, and RAID 6 architecture, the groups of storage devices (102, 104, and 106) will include at least three storage devices respectively. If the groups of storage devices (102, 104, and 106) are specified in RAID 0 architecture, the groups of storage devices (102, 104, and 106) will include at least one storage device respectively. If the groups of storage devices (102, 104, and 106) are specified in RAID 1 architecture, the groups of storage devices (102, 104, and 106) will include at least two storage devices respectively. For example, as shown in FIG. 1, the group of storage devices 102 includes three storage devices 1022, is specified in RAID 5 architecture, and has a respective retained volume 102a. The group of storage devices 104 includes twenty storage devices 1042, is specified in RAID 6 architecture, and has a respective retained volume 104a. The group of storage devices 106 includes five storage devices 1062, is specified in RAID 5 architecture, and has a respective retained volume 106a.

In one embodiment, each of the storage devices (1022, 1042, 1062) can be a SAS disk drive, a SATA disk drive, a Solid State Drive (SSD), a tape drive, a memory device, an optical storage drive, a sector corresponding to a single read-write head at the same disk drive, or other equivalent storage devices.

The controller 12 is respectively coupled to each of the storage devices (1022, 1042, 1062), and functions controlling access of a plurality of batches of data to the storage devices (1022, 1042, 1062), for example, a batch of data BD1 stored in the group of storage devices 102, a batch of data BD2 stored in the group of storage devices 104, and a batch of data BD3 stored in the group of storage devices 106. The controller 12 can also generate (reconstruct) redundant data which are identical to data to be read. The controller 12 can generate redundant data by Exclusive OR (XOR) operation, or other equivalent operation. For example, in RAID 6 architecture, the controller 12 generates redundant data by other equivalent operation rather than Exclusive OR (XOR) operation.

FIG. 1 also illustratively shows an application I/O request unit 20. The data storage system 1 according to the invention also includes a transmission interface 18. The application I/O request unit 20 is coupled to the controller 12 through the transmission interface 18. In practical application, the application I/O request unit 20 can be a network computer, a mini-computer, a mainframe, a notebook computer, or any electronic apparatus needing to read data in the data storage system 1, e.g., a cell phone, a personal digital assistant (PDA), digital recording apparatus, digital music player, and so on.

When the application I/O request unit 20 is a stand-alone electronic apparatus, it can be coupled to the data storage system 1 through a transmission interface such as a storage area network (SAN), a local area network (LAN), a serial ATA (SATA) interface, a fiber channel (FC) interface, a small computer system interface (SCSI), and so on, or other I/O interface such as a PCI express interface. In addition, when the application I/O request unit 20 is a specific integrated circuit device or other equivalent devices capable of transmitting I/O read requests, it can send read requests to the controller 12 according to commands (or requests) from other devices, and then read data in the storage devices (1022, 1042, 1062) via the controller 12.

The controller 12 in the data storage system 1 and the groups of storage devices (102, 104, and 106) can not only be placed in an enclosure, but can also be separately placed in different enclosures. In practical application, the controller 12 can be coupled to the data storage devices (1022, 1042, 1062) through transmission interfaces such as FC, SCSI, SAS, SATA, PATA, and so on. If the data storage devices (1022, 1042, and 1062) are disk drives, each of data storage devices (1022, 1042, and 1062) could be different interfaces of disk drives such as FC, SCSI, SAS, SATA, PATA, and so on that are industrial standards well defined in the arts. The controller 12 can be a RAID controller or a controller capable of generating redundant data for the data storage system.

The group management table 142 is coupled to the controller 12. The data management table 144 is coupled to the controller 12. In practical application, the data storage system 1 according to the invention also includes a memory 14 which the group management table 142 and the data management table 144 are stored in.

The group management table 142 functions storing logical locations of each group of storage devices (102, 104, 106) and at least N sets of condition thresholds which each set of condition thresholds relates to one of the N groups of storage devices (102, 104, 106).

The data management table 144 functions storing virtual drive locations of the batches of data mapping the logical locations of the storage devices (1022, 1042, 1062) and a plurality of use information which each relates to one of the batches of data.

The judging module 15 is respectively coupled to the controller 12, the group management table 142 and the data management table 144. The judging module 15 functions judging if the use information of one of the batches of data satisfies the set of condition thresholds relative to the group of storage devices (102, 104 or 106) where said one batch of data is stored. And if the result judged by the judging module 15 is NO, the controller 12 will re-allocate said one batch of data to the retained volume of one of the group of storage devices whose condition thresholds are satisfied by the use information of said one batch of data, and update the virtual drive locations of said one batch of data mapping the logical locations of the storage devices in the data management table 144.

During re-allocating batches of data, the advantages of moving batches of data to the retained volume of the group of storage devices are that the batches of data are safely moved, and the moving of the batches of data is speeded up without the need of extra replacement volume.

In one embodiment, each set of condition thresholds includes a respective access frequency threshold, for example, once per day or once per week as the access frequency threshold. The use information of each batch of data includes an access frequency. The judging module 15 functions judging if the access frequency of one of the batches of data satisfies the access frequency threshold relative to the group of storage devices (102, 104, or 106) where said one batch of data is stored.

Figure 2A:
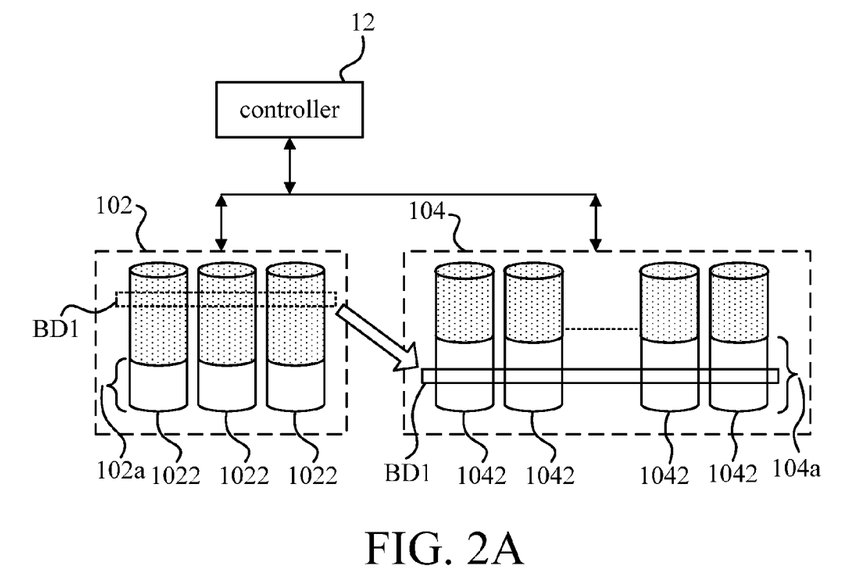
FIG. 2A is a schematic diagram showing a part of the architecture of an example 1 of the invention for re-allocating batches of data according to an access frequency threshold of each group of storage devices and controlling power of each group of storage devices in different power operation modes.

Also as shown in FIG. 1, according to another preferred embodiment of the invention, the data storage system 1 further includes a power control module 16. The power control module 16 is respectively coupled to each of the storage devices (1022, 1042, and 1062) and the group management table. The power control module 16 functions controlling power of each group of storage devices (102, 104, 106) in one of M power operation modes in accordance with the condition thresholds of said one group of storage devices (102, 104, 106), where M is an integer larger than 1. In practical application, the condition threshold of each group of storage devices (102, 104, 106) just is the respective access frequency threshold Please refer to FIGS. 2A and 2B. Example 1 of the invention for re-allocating batches of data according to the respective access frequency threshold of each group of storage devices and controlling power of each group of storage devices in different power operation modes is illustratively shown in FIGS. 2A and 2B. FIG. 2A only illustratively shows the controller 12, the group of storage devices 102, and the group of storage devices 104. The group of storage devices 102 includes three storage devices 1022, and is specified in RAID 5 architecture. The group of storage devices 104 includes twenty-nine storage devices 1042, and is specified in RAID 6 architecture. The respective access frequency threshold of the group of storage devices 102 is once per day, and the power operation mode of the group of storage devices 102 is 82% of time in active mode and 18% of time in sleep mode. The respective access frequency threshold of the group of storage devices 104 is once per week, and the power operation mode of the group of storage devices 104 is 13% of time in active mode and 87% of time in sleep mode. The power consumption of each of storage devices is 12.8 (W/hr.) in active mode. The power consumption of each of storage devices is 1.7 (W/hr.) in sleep mode. The access frequency of the batch of data BD1 originally stored in the group of storage devices 102 does not satisfied (lower) the access frequency threshold relative to the group of storage devices 102 (once per day) but satisfies (not lower) the access frequency threshold relative to the group of storage devices 104 (once per week). Therefore, the controller 12 re-allocates the batch of data BD1 to the retained volume 104a of the group of storage devices 104.

Figure 2B:
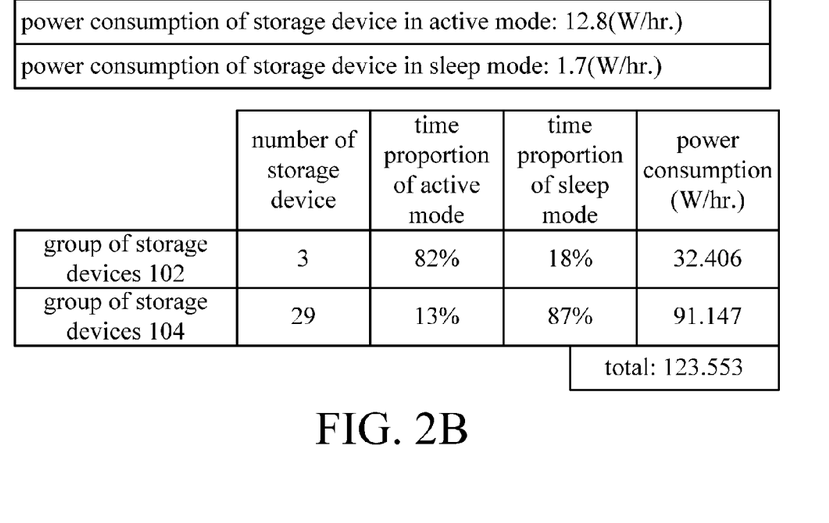
FIG. 2B illustratively shows a power consumption result of example 1 of the invention shown in FIG. 2A.
Figure 2C:
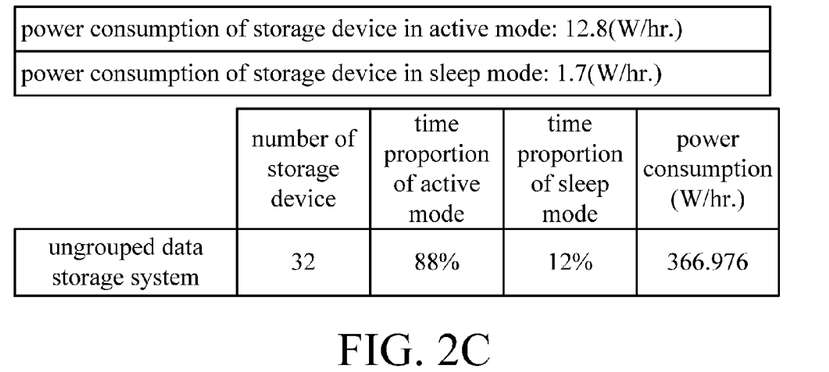
FIG. 2C illustratively shows a power consumption result of the architecture of a prior art having the same numbers of storage devices of example 1 shown in FIG. 2A.

As shown in FIG. 2B, the overall power consumption of the group of storage devices 102 is 32.406 (W/hr.). The overall power consumption of the group of storage devices 104 is 91.147 (W/hr.). The total power consumption of the group of storage devices 102 and the group of storage devices 104 controlled according to the invention is 123.553 (W/hr.). Taking a prior art as a contrast, the prior art controls thirty-two storage devices simultaneously, and the power operation mode of the prior art is 88% of time in active mode and 12% of time in sleep mode, as shown in FIG. 2C. The total power consumption of the prior art used to control thirty-two storage devices simultaneously is 366.976 (W/hr.). Obviously, compared with the prior art shown in FIG. 2C, example 1 of the invention shown in FIGS. 2A and 2B saves 66% of power consumption.

In one embodiment, each set of condition thresholds includes a respective storage life, for example, storage of five years as the storage life. Moreover, the use information of each batch of data includes a storage time. The judging module 15 functions judging if the storage time of one of the batches of data satisfies the storage life relative to the group of storage devices (102, 104 or 106) where said one batch of data is stored.

Also as shown in FIG. 1, according to another preferred embodiment of the invention, the data storage system 1 further includes a management interface 17. The management interface 17 is coupled to the group management table 142. An external processing module 22 is capable of altering the condition thresholds of each group of storage devices (102, 104, and 106) through the management interface 17.

Figure 3:
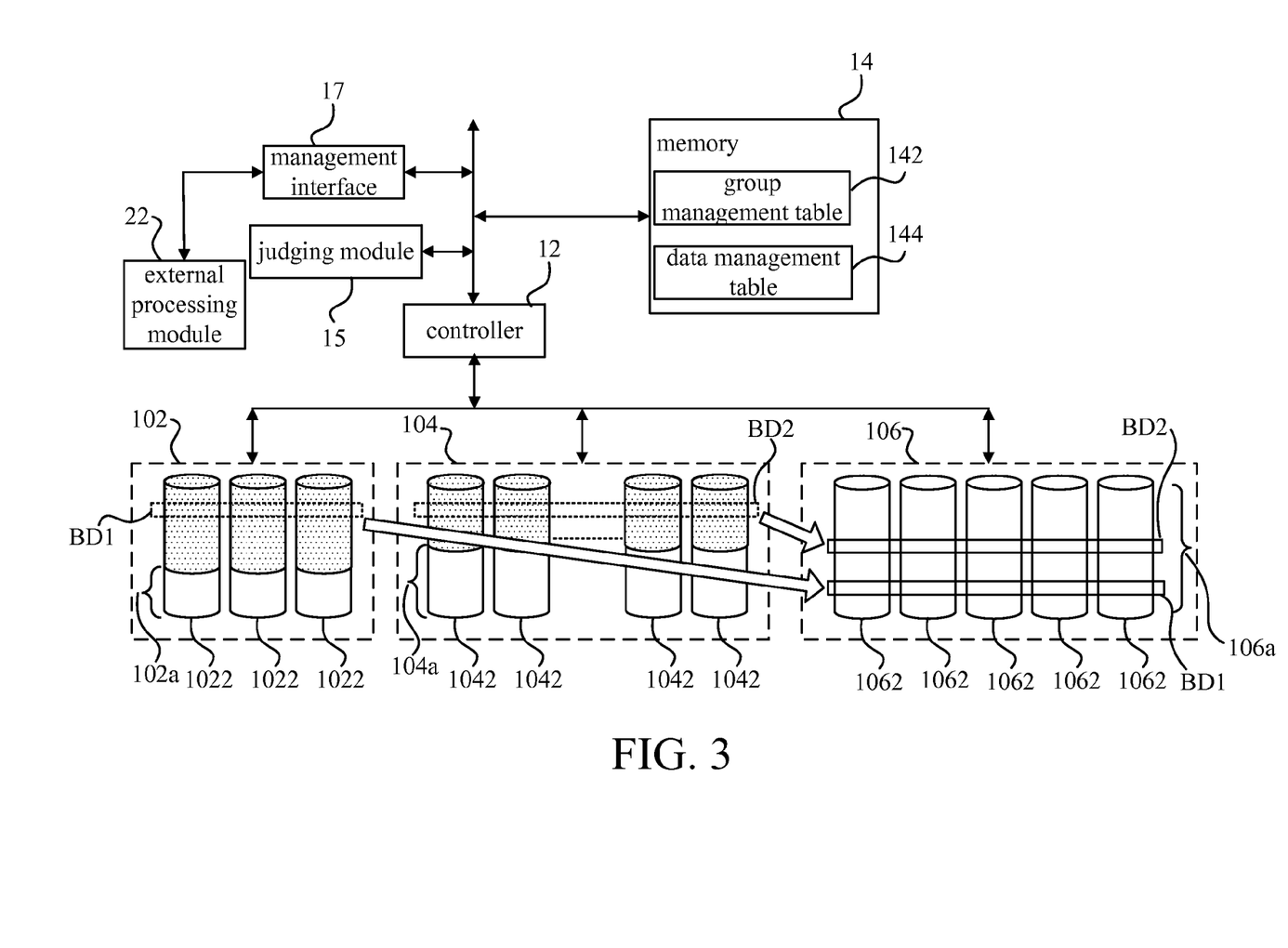
FIG. 3 is a schematic diagram showing a part of the architecture of an example 2 of the invention for re-allocating batches of data according to a storage life relative to each group of storage devices.

Please refer to FIG. 3. Example 2 of the invention for re-allocating batches of data according to the respective storage life of each group of storage devices is illustratively shown in FIG. 3. FIG. 3 only illustratively shows the controller 12, the judging module 15, the management interface 17, the external processing module 22, the group of storage devices 102, the group of storage devices 104, the group of storage devices 106, the memory 14, and the group management table 142 and the data management table 144 stored in the memory 14. The group of storage devices 102 includes three storage devices 1022, and is specified in RAID 5 architecture, where each storage volume of the storage devices 1022 is 100 GB. The group of storage devices 104 includes twenty storage devices 1042, and is specified in RAID 6 architecture, where each storage volume of the storage devices 1042 is 100 GB. The group of storage devices 106 includes five storage devices 1062, and is specified in RAID 5 architecture, where each storage volume of the storage devices 1062 is 500 GB.

In example 2, the storage life relative to the group of storage devices 102 is ten years inherently, and the storage time of the batch of data (such as numeral notation BD1) been stored in the group of storage devices 102 is nine years. The group of storage devices 106 is an added group of storage devices. The storage life relative to the group of storage devices 104 is ten years inherently, and the storage time of the batch of data (such as numeral notation BD2) been stored in the group of storage devices 104 is nine years. The group of storage devices 102 and the group of storage devices 104 which are similar to general electronic devices have a respective useful life. In order to extend the useful lives of batches of data been stored in the group of storage devices 102 and the group of storage devices 104 (such as numeral notations BD1 and BD2), the group of storage devices 106 is added to move the batches of data stored in the group of storage devices 102 and the group of storage devices 104 to the group of storage devices 106, and then to replace the group of storage devices 102 and the group of storage devices 104. With the invention, the external processing module 22 alters the storage lives of the group of storage devices 102 and the group of storage devices 104 as 0 year through the management interface 17. The judging module 15 will judge that the storage time of the batches of data been stored in the group of storage device 102 does not satisfy (actually excess) the storage life of the group of storage device 102, and that the storage time of the batches of data been stored in the group of storage device 104 does not satisfy (actually excess) the storage life of the group of storage devices 104. And then, the controller 12 moves the batches of data stored in the group of storage devices 102 and the group of storage devices 104 to the retained volume 106a of the group of storage devices 106. Obviously, the invention can be conveniently and safely used to replace old group of storage devices in a data storage system.

Figure 4:
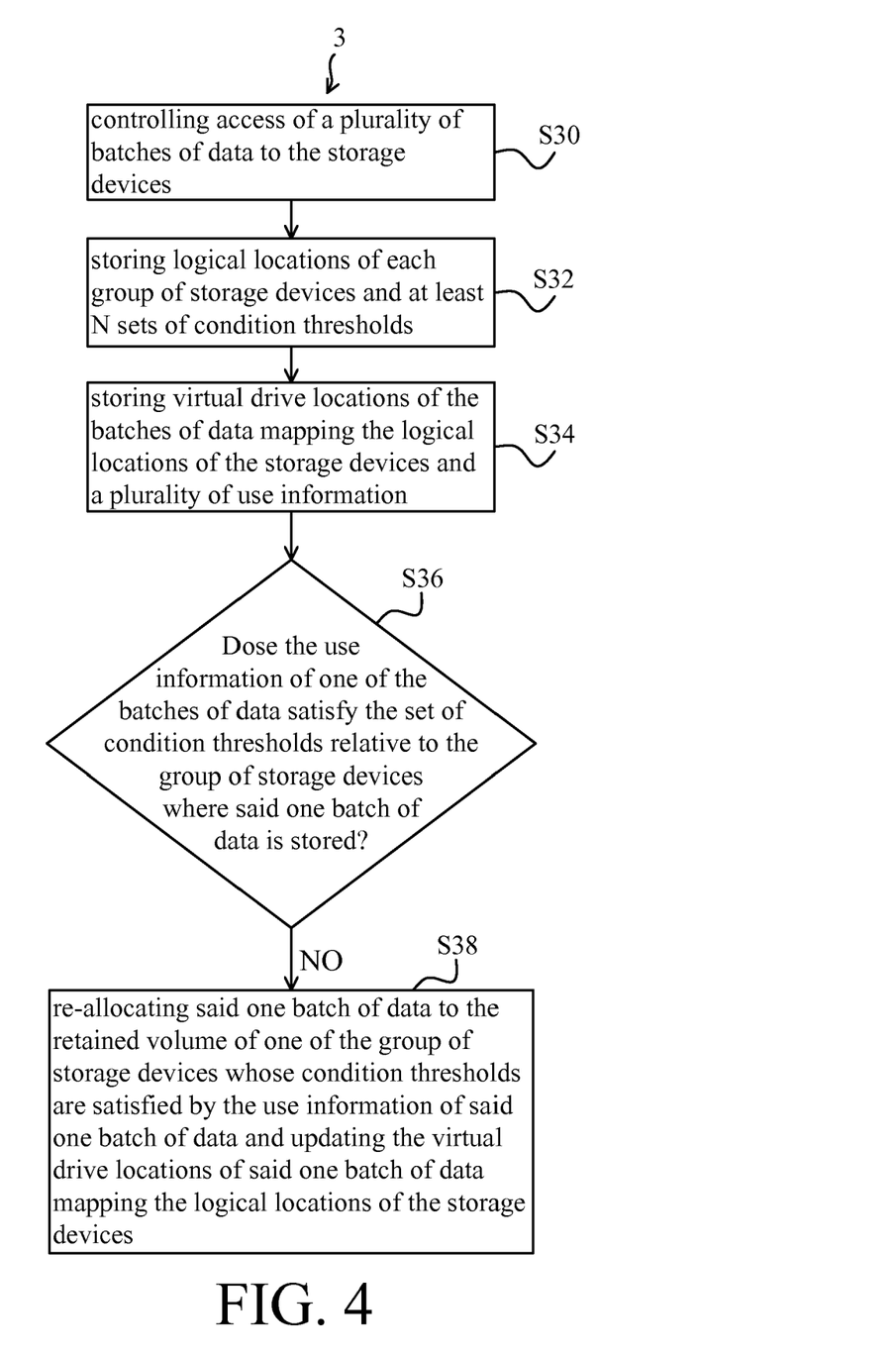
FIG. 4 is a flow chart illustrating a control method 3 according to a preferred embodiment of the invention.

Please refer to FIG. 4. FIG. 4 is a flow chart illustrating a control method 3 according to a preferred embodiment of the invention. The control method 3, according to the invention, functions controlling a data storage system which includes N groups of storage devices where N is an integer larger than 1. Each group of storage devices has a respective retained volume and is respectively specified in one among RAID 0 architecture, RAID 1 architecture, RAID 3 architecture, RAID 5 architecture, RAID 6 architecture, and others such as RAID 10 architecture, RAID 1E architecture, RAID 50 architecture, RAID 30 architecture, RAID 60 architecture, Hyper-speed RAID architecture, and JBOD architecture, etc.

As shown in FIG. 4, the control method 3 according to the invention, first, performs step S30 to control access of a plurality of batches of data to the storage devices.

Next, the control method 3 according to the invention performs step S32 to store logical locations of each group of storage devices and at least N sets of condition thresholds which each set of condition thresholds relates to one of the N groups of storage devices.

Then, the control method 3 according to the invention performs step S34 to store virtual drive locations of the batches of data mapping the logical locations of the storage devices and a plurality of use information which each relates to one of the batches of data.

Afterward, the control method 3 according to the invention performs step S36 to judge if the use information of one of the batches of data satisfies the set of condition thresholds relative to the group of storage devices where said one batch of data is stored.

In one embodiment, each set of condition thresholds includes a respective access frequency threshold. And step S36 is to judge if the access frequency of one of the batches of data satisfies the access frequency threshold relative to the group of storage devices where said one batch of data is stored.

Finally, if the judgment in step S36 is NO, the control method 3 according to the invention will perform step S38 to re-allocate said one batch of data to the retained volume of one of the group of storage devices whose condition thresholds are satisfied by the use information of said one batch of data and updating the virtual drive locations of said one batch of data mapping the logical locations of the storage devices.

According to a preferred embodiment of the invention, the control method 3 further controls power of each group of storage devices in one of M power operation modes in accordance with the condition thresholds of said one group of storage devices, where M is an integer larger than 1.

In practical application, the data storage system also includes a management interface. An external processing module is capable of altering the condition thresholds of each group of storage devices through the management interface.

With the detailed description of the above preferred embodiments of the invention, it is clear to understand that the data storage system and control method thereof provided by the invention enable batches of data to be re-allocated according to specific conditions rather than be stored in fixed locations. By use of the retained volume of the group of storage devices, the batches of data can be directly moved without the need of any extra replacement volume. Therefore, it can enhance the moving speed of the batches of data. The design and setting regarding the condition thresholds, the use information, and a judging algorithm between the condition thresholds and the use information have considerable flexibility, and depend on different requirements to achieve optimum allocation of data in the data storage system. More particularly, the data storage system and control method thereof according to the invention implement without the need of any special hardware, but only with the need of altering the algorithm stored in firmware. Therefore, the data storage system and control method thereof according to the invention has high feasibility and extension.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A data storage system, comprising:
   N groups of storage devices, N being an integer larger than 1, each group of storage devices having a respective retained volume and respectively being specified in one selected from the group consisting of RAID 0 architecture, RAID 1 architecture, RAID 3 architecture, RAID 5 architecture, RAID 6 architecture, RAID 10 architecture, RAID 1E architecture, RAID 50 architecture, RAID 30 architecture, RAID 60 architecture, Hyperspeed RAID architecture, and JBOD architecture;
a controller, respectively coupled to each storage device, for controlling access of a plurality of batches of data to the storage devices;
a group management table, coupled to the controller, for storing logical locations of each group of storage devices and at least N sets of condition thresholds which each set of condition thresholds relates to one of the N groups of storage devices;
a data management table, coupled to the controller, for storing virtual drive locations of the batches of data mapping the logical locations of the storage devices and a plurality of use information which each relates to one of the batches of data; and
a judging module, respectively coupled to the controller, the group management table and the data management table, for judging if the use information of one of the batches of data satisfies the set of condition thresholds relative to the group of storage devices where said one batch of data is stored, and if NO, the controller re-allocating said one batch of data to a retained volume of one of the group of storage devices whose condition thresholds are satisfied by the use information of said one batch of data, and updating the virtual drive locations of said one batch of data mapping the logical locations of the storage devices in the data management table.

2. The data storage system of claim 1, further comprising:
a power control module, respectively coupled to each of the storage device and the group management table, for controlling power of each group of storage devices in one of M power operation modes in accordance with the condition thresholds of said one group of storage devices, wherein M is an integer larger than 1.

3. The data storage system of claim 1, wherein each set of condition thresholds comprises a respective storage life, the use information of each batch of data comprises a storage time, and the judging module functions judging if the storage time of one of the batches of data satisfies the storage life relative to the group of storage devices where said one batch of data is stored.

4. The data storage system of claim 1, wherein each set of condition thresholds comprises a respective access frequency threshold, the use information of each batch of data comprises an access frequency, and the judging module functions judging if the access frequency of one of the batches of data satisfies the access frequency threshold relative to the group of storage devices where said one batch of data is stored.

5. The data storage system of claim 1, further comprising:
a management interface, coupled to the group management table, an external processing module being capable of altering the condition threshold of each group of storage devices through the management interface.

6. A control method for controlling a data storage system which comprises N groups of storage devices, N being an integer larger than 1, each group of storage devices having a respective retained volume and respectively being specified in one selected from the group consisting of RAID 0 architecture, RAID 1 architecture, RAID 3 architecture, RAID 5 architecture, RAID 6 architecture, RAID 10 architecture, RAID 1E architecture, RAID 50 architecture, RAID 30 architecture, RAID 60 architecture, Hyperspeed RAID architecture, and JBOD architecture, said control method comprising the steps of:
(a) controlling access of a plurality of batches of data to the storage devices;
(b) storing logical locations of each group of storage devices and at least N sets of condition thresholds which each set of condition thresholds relates to one of the N groups of storage devices;
(c) storing virtual drive locations of the batches of data mapping the logical locations of the storage devices and a plurality of use information which each relates to one of the batches of data;
(d) judging if the use information of one of the batches of data satisfies the set of condition thresholds relative to the group of storage devices where said one batch of data is stored; and
(e) if NO in step (d), re-allocating said one batch of data to a retained volume of one of the group of storage devices whose condition thresholds are satisfied by the use information of said one batch of data and updating the virtual drive locations of said one batch of data mapping the logical locations of the storage devices.

7. The control method of claim 6, further comprising the step of:
controlling power of each group of storage devices in one of M power operation modes in accordance with the condition thresholds of said one group of storage devices, wherein M is an integer larger than 1.

8. The control method of claim 6, wherein each set of condition thresholds comprises a respective storage life, the use information of each batch of data comprises a storage time, and step (d) is to judge if the storage time of one of the batches of data satisfies the storage life relative to the group of storage devices where said one batch of data is stored.

9. The control method of claim 6, wherein each set of condition thresholds comprises a respective access frequency threshold, the use information of each batch of data comprises an access frequency, and step (d) is to judge if the access frequency of one of the batches of data satisfies the access frequency threshold relative to the group of storage devices where said one batch of data is stored.

10. The control method of claim 6, wherein the data storage system also comprises a management interface, an external processing module is capable of altering the condition threshold of each group of storage devices through the management interface.

* * * * *